Feb. 6, 1934.  E. R. EVANS  1,946,135
MOTOR VEHICLE BRAKE
Filed Sept. 4, 1923   3 Sheets-Sheet 2
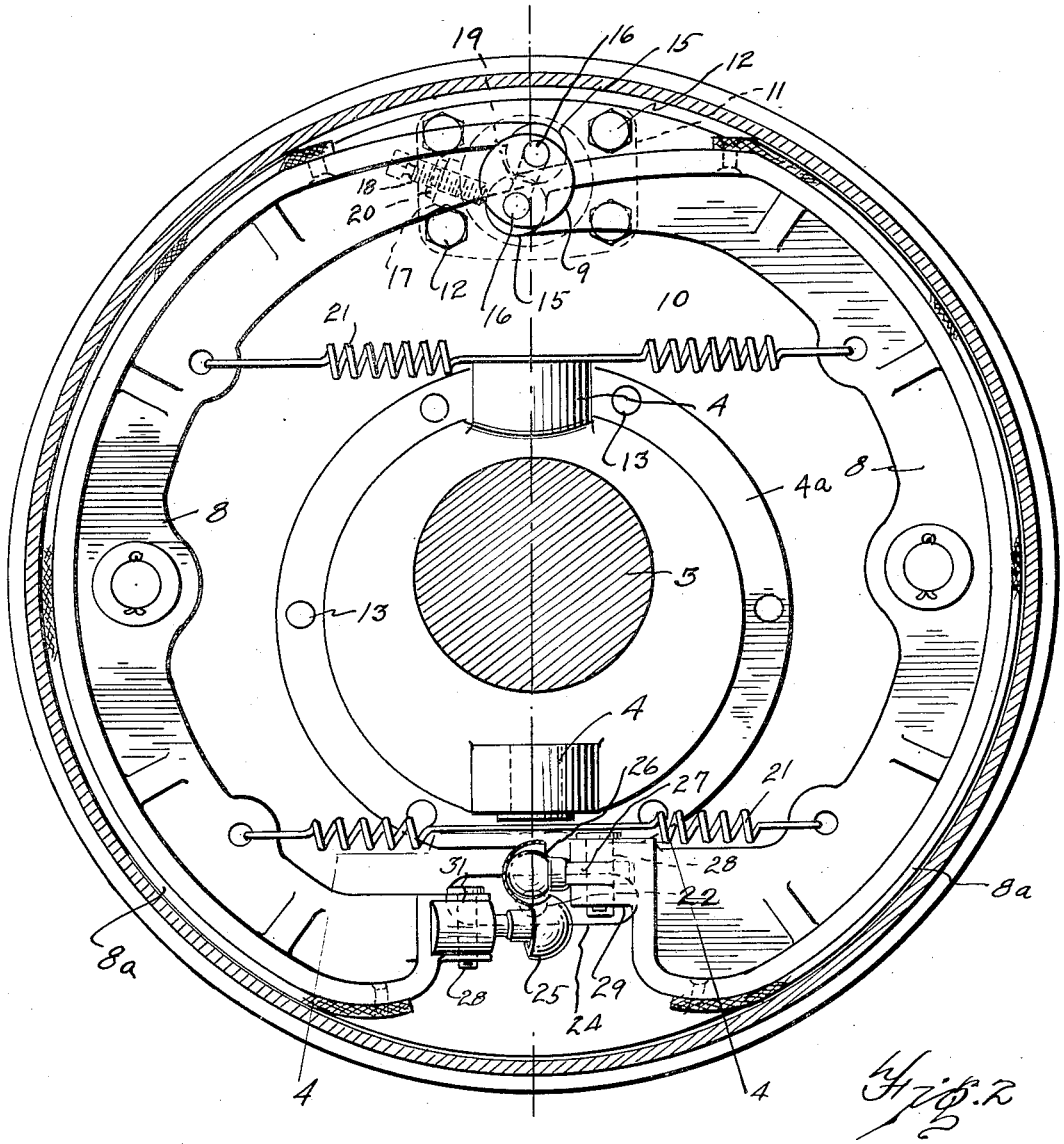
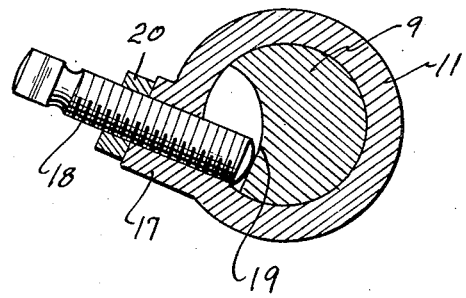
INVENTOR.
EDWIN R. EVANS
BY Whittemore, Hulbert, Whittemore, & Belknap
ATTORNEYS Feb. 6, 1934.  E. R. EVANS  1,946,135
MOTOR VEHICLE BRAKE
Filed Sept. 4, 1923  3 Sheets-Sheet 3
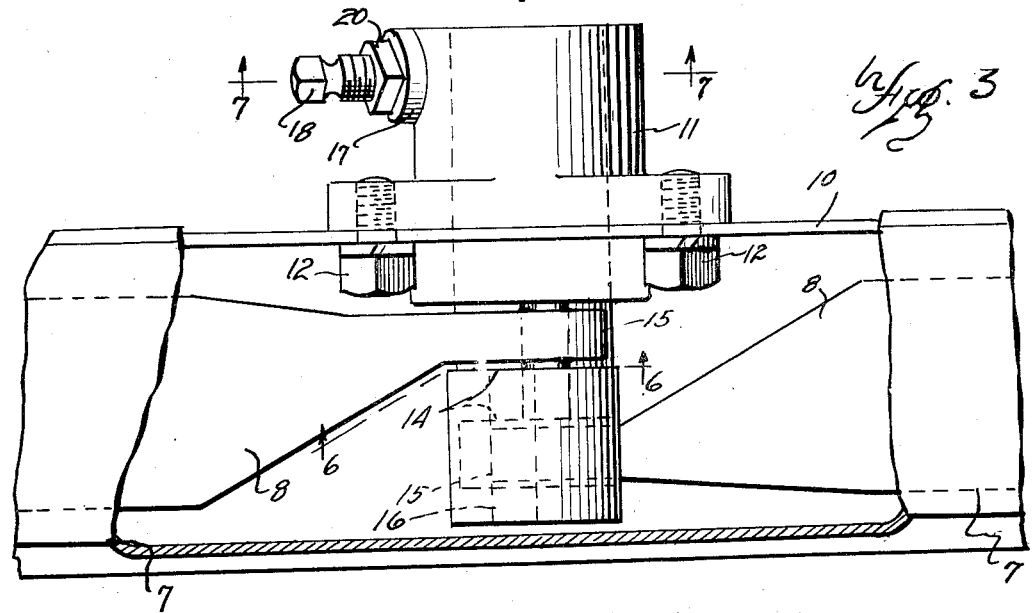
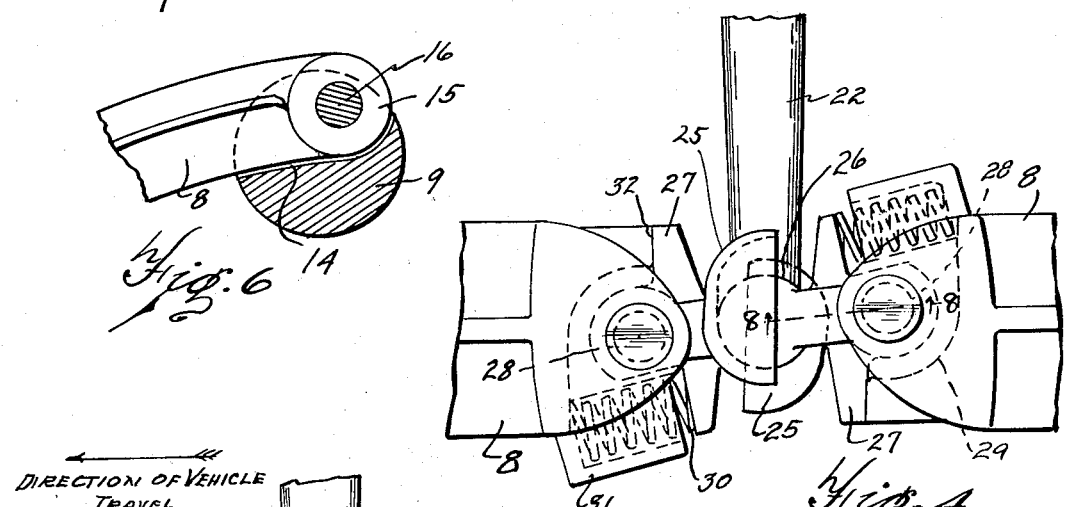
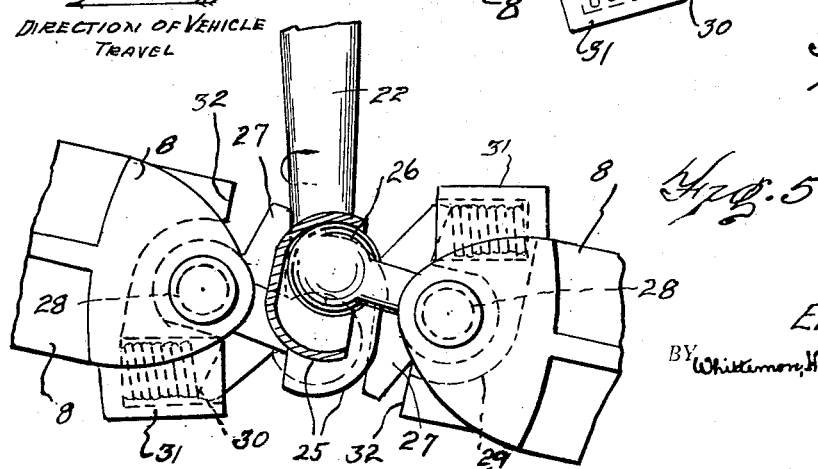
INVENTOR.
EDWIN R. EVANS
BY Whittemore, Hulbert, Whittemore & Belknap
ATTORNEYS Patented Feb. 6, 1934

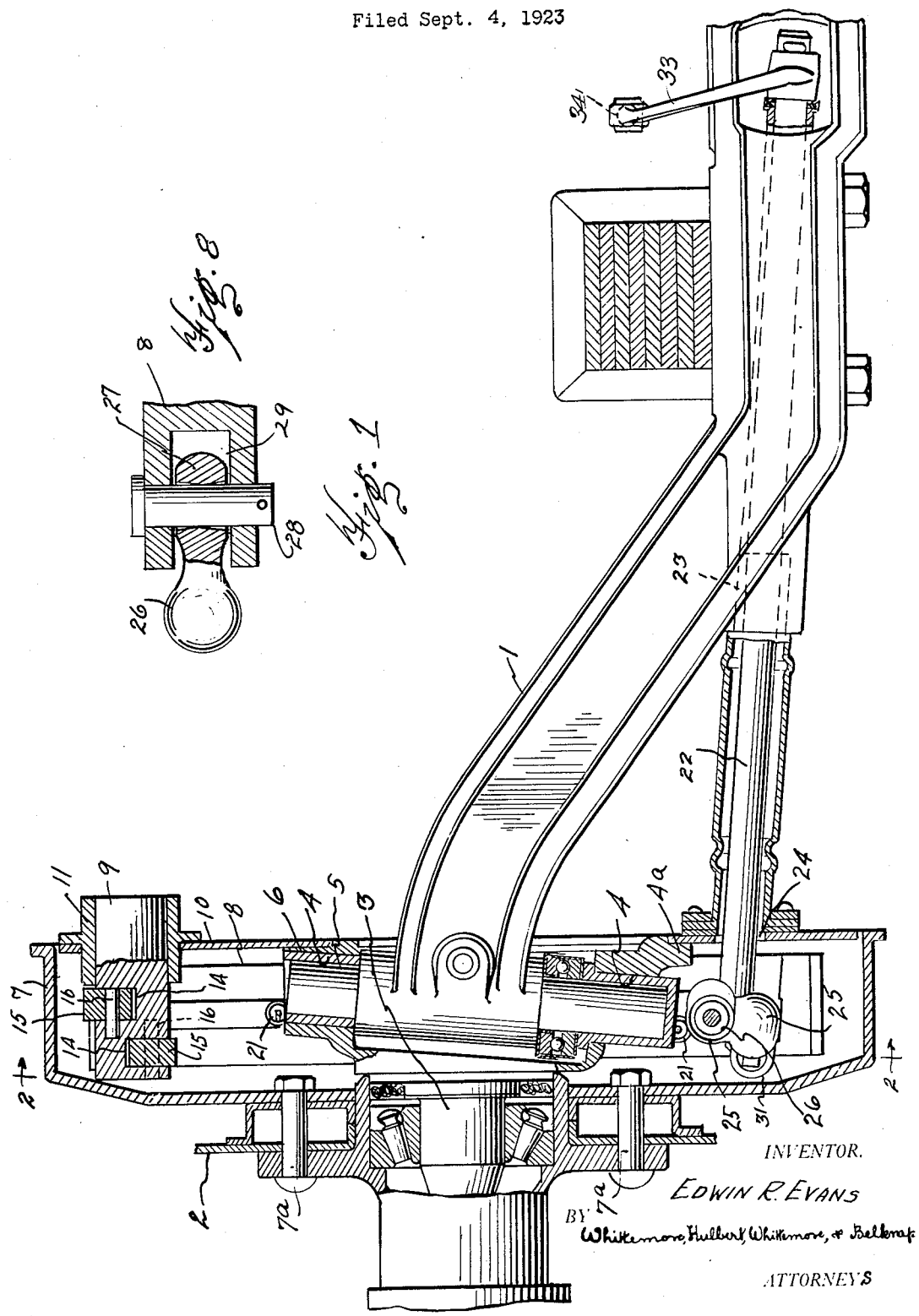

1,946,135

UNITED STATES PATENT OFFICE 1,946,135

MOTOR VEHICLE BRAKE

Edwin R. Evans, Detroit, Mich.

Application September 4, 1923. Serial No. 660,856

24 Claims. (Cl. 188—194)

This invention relates to motor vehicle brakes and relates particularly to brakes for front wheels of motor vehicles.

The invention consists in the structural features and arrangement of parts hereinafter set forth.

In the drawings:—

Figure 1 is a diametrical vertical sectional view of a wheel equipped with the improved brake, a portion of the axle mounting said wheel being also shown;

Figure 2 is a sectional view on line 2—2 of Figure 1 showing primarily the arrangement of the brake shoes in the drum;

Figure 3 is a fragmentary plan view of the brake drum with a portion thereof broken away to disclose a pivotal support for the brake shoes;

Figure 4 is a section on line 4—4 of Figure 2 showing the actuating means for the brake shoes;

Figure 5 is a similar view but showing the non-responsive adjustment of the brake shoes resulting when the outer front wheel of the vehicle is making a turn through more than a predetermined radius;

Figure 6 is a cross section on line 6—6 of Figure 3;

Figure 7 is a cross section on line 7—7 of Figure 3;

Figure 8 is a section on line 8—8 of Figure 4 showing the hinged connection between the brake shoes proper and the lower end portions of said shoes.

In these views, the reference character 1 designates the front axle of a motor vehicle and 2 one of the wheels mounted thereupon. For steering purposes it is the general practice to swivel the front wheels upon the axle. Thus the wheel 2 is journaled upon a spindle 3 which has a pair of integral spaced bearings 4 respectively above and below the spindle axis for receiving the end portions of an approximately vertical pin 5 engaging a bearing 6 integral with the axle between said bearings 4 and thus establishing the desired swivel steering axis for the wheel. 4ª is an annular flange integral with the bearings 4 and spindle 3. 7 is a brake drum secured by bolts 7ª or the like to the wheel 2 in the customary concentric relation to said wheel and 8 designates a pair of complementary brake shoes respectively semi-circular in form arranged within said drum, one at each side of the vertical axis thereof and provided with the customary linings 8ª for frictional engagement with the drum. The upper ends of the brake shoes are engaged with a common pivotal support and a common means for spreading said shoes is engaged with the lower ends thereof. Said support is formed by a cylindrical member 9 which passes through the annular plate 10 closing the open side of the brake drum and is mounted rotatively in a bracket 11 secured exteriorly to the plate 10 by bolts 12. The plate 10 is held in proper position by bolts or rivets 13 securing it to the flange 4ª. Within the brake drum the shoe support 9 has grooves 14 transverse to its axis formed respectively in its upper and lower faces and in said grooves are engaged apertured pivot bearings 15 terminally integral with the brake shoes, the apertures of said bearings being engaged by pivot pins 16 parallel to the axis of the support 9 and suitably fixed in said support, as for example by a pressure fit therein. It is preferred, upon original assembly of the described construction, to adjust the support 9 (rotatively) to establish a slightly divergent relation between the common axial plane of the pins 16 and the vertical axial plane of said support. Thus in adjusting the shoes to compensate for wear thereof (and of the brake drum) the support 9, as shown in Figure 2, may be rotated by successive adjustments to bring the common axial plane of the pins 16 into coincidence with the vertical axial plane of the support 9 and subsequent adjustments will eventually establish a reverse divergence between the two said planes to that originally existing and shown in Figure 2. As a means for subjecting the pivotal support 9 to the described rotative adjustment, a boss 17 is formed integrally upon the bracket 11 and an adjusting screw 18, screw threaded in said boss, terminally bears upon a square shoulder 19 machined in the support to rotate the same as above described. 20 is a lock nut upon said screw bearing upon the boss 17 to hold the screw in a fixed adjustment. It will be noted that the described adjustment means, while primarily acting to shift the engaged ends of the shoes from each other, also moves said ends slightly in a vertical direction. Said vertical movement, however, is sufficiently slight, owing to the small total angle of rotative travel of the member 9, as to be negligible. A pair of coiled springs 21 connecting the two brake shoes and urging the same toward each other and clear of the brake drum, act further to insure against any rotative shifting of the pivotal support 9 reverse to that which the screw 18 is adapted to impart.

Describing the actuating means for the brake shoes, 22 is a cam shaft journaled in a bearing 23 carried by the front axle 1 and preferably integral therewith. The shaft 22 is provided with an operating arm 33 to which is connected the usual brake actuating pull rod 34. Said shaft passes through a slot 24 in the lower portion of the plate 10, the purpose of said slot being to afford the necessary clearance for the shaft when said plate in unison with the brake drum and wheel is undergoing steering movement about the axis established by the pin 5. Within the brake drum the shaft 22 terminally carries in any desired manner a head comprising a pair of oppositely opening approximately hemispherical sockets 25 arranged respectively above and below said shaft, as is best seen in Figure 2. Said sockets are respectively engaged by ball members 26 which are formed preferably integrally with the hinged heads or separate ends 27 of the brake shoes. The heads 27 are hinged or pivoted by vertical pins 28 to the shoes proper, the latter having their adjacent extremities bifurcated as indicated at 29 and the ends 27 being engaged between the furcations. The hinged shoe ends 27 are respectively acted upon by coiled springs 30 engaging sockets 31 integrally formed on the bifurcated ends of the shoes, said springs tending to urge the ends 27 about the pivot pins 28 to the positions shown in Figure 4 in which said ends 27 bear against corresponding shoulders 32 formed upon the shoes proper. As is best seen in Figure 8, the engagement of the hinged members 27 with the pins 28 is such as to permit a limited up and down rocking of said members, as well as swinging of the same about the axes established by said pins. This accommodates for the slight travel of the balls 26 toward the horizontal plane of the shaft 22 when said shaft is rocked.

Considering now the described actuating means, when the cam shaft 22 is rocked, the ball members 26 are subjected by the socket forming head 25 to oppositely acting thrusts which are transmitted through the hinge pins 28 to the lower end of the shoes 8, thus forcing the shoes apart and into braking engagement with the drum 7. As shown, (Figure 1) the swivel steering axis established by the pin 5 intersects the axis of the cam shaft 22 approximately in the plane transverse to said shaft established by the centers of the ball members 26. Consequently the cooperative relation of the head 25 to the ball members 26 is not effected by turning of the brake shoes in unison with the swivel steering movement of the wheel about the axis of the pin 5.

When a vehicle equipped with front wheel brakes is making a turn either to right or left it is desirable that one of said wheels, and preferably the outermost one, be substantially free to rotate in case an application of brakes is made concurrently with such turning movement. By permitting under such conditions a rotation of at least one of the wheels the driver is permitted to exercise a considerable degree of steering control, whereas an application of the brakes to both front wheels leaves the vehicle responsive almost entirely to its own momentum as regards direction and deprives the driver of the proper steering control which is most essential under such conditions. The provision of the hinged extremities 27 through which the actuating effort is transmitted to the brake shoes proper is for the purpose of automatically preventing response of the shoes of the wheel on the outer side of a turn to an actuating effort when the vehicle equipped with the described brake is making a turn exceeding a predetermined radius. That is to say, if the turning movement of either of a pair of front wheels is such as to shift the axial plane of the pins 28 beyond coincidence with the plane of thrust transmitted to the ball members 26 the subsequent actuating effort will not be effective to apply the brakes but will rather tend to swing the pivoted heads 27 of the brake shoes about the pins 28 in opposition to the springs 30, as is best shown in Figure 5. As the course of travel of the vehicle again becomes approximately straight the resulting movement of the pins 28 will again carry their axial plane across the plane of thrust transmission to the brake shoes so that the subsequent braking effort will act upon the shoes through the engageable shoulders 32. The lateral elongation of the sockets 25, best seen in Figures 4 and 5, is to provide for a lateral shifting of the balls 26 in said sockets under the conditions which Figure 5 illustrates. It is to be understood, however, that the adjacent ends of the brake shoes may shift to some extent laterally and oppositely to accommodate said movement of the balls 26.

A desirable feature of the described provision for restraining the front brake shoes against response to a braking effort under certain predetermined conditions lies in the fact that the result is attained by a means disposed entirely within the brake drum.

What I claim as my invention is:—

1. A brake for a vehicle wheel, swivelled for steering movement, comprising a brake drum carried by said wheel, a member frictionally engageable with said drum, an actuating element for said member, and an actuating connection between said element and member yieldable relative to said member in a predetermined position of swivel movement of the brake drum and wheel.

2. A brake for a vehicle wheel, swivelled for steering movement, comprising a brake drum carried by said wheel, a brake shoe interiorly engageable with said drum, an actuating element for said shoe, and a member transmitting the effort of said element to the shoe yieldable in a predetermined position of swivel movement of the wheel, drum and shoe to absorb the actuating effort, substantially independently of the shoe.

3. A brake for a vehicle wheel, swiveled for steering movement, comprising a brake drum, a brake shoe interiorly engageable with said drum, an actuating element for said shoe, and an actuating connection between said element and shoe having a toggle connection with the latter providing for yielding of said connection relative to the shoe responsive to an actuating effort in a predetermined position of swivel movement of the wheel, drum, and shoe.

4. A brake for a vehicle wheel, swivelled for steering movement, comprising a brake drum, a brake shoe interiorly engageable with said drum, an actuating element for said shoe acting upon the shoe in a plane substantially transverse to the axis of the drum and a head hinged to said shoe and receiving the actuating effort, the hinge axis being normally slightly offset to one side of the plane of actuating thrust and being movable across said plane through a predetermined swivel steering movement of the wheel, drum and shoe adapting said hinged head to respond to the actuating thrust by movement about its hinge axis.

5. A brake for a vehicle wheel, swivelled for steering movement, comprising a brake drum secured to said wheel, a brake shoe interiorly engageable with said drum, an actuating element for said shoe located substantially in the axis of steering movement of said wheel, a head hinged to said shoe and transmitting to the latter the effort of said actuating member, said head having a shoulder seating upon the shoe to transmit the thrust under conditions of substantially straight ahead travel of the vehicle, a spring acting upon said hinged head to engage its shoulder with the shoe under the said conditions, the hinged axis of said head being movable across the plane of transmission of the actuating effort upon a predetermined swivel steering movement of the wheels in one direction, and said head being subsequently angularly movable about its hinged axis responsive to a brake applying effort.

6. A brake for a vehicle wheel, swivelled for steering movement, comprising a brake shoe, a rock shaft for actuating said shoe having its axis substantially intersecting the swivel axis of the wheel, and ball and socket members, one of which is carried by said shaft and the other by said shoe for actuating the latter from the former, the same being centered substantially in a plane transverse to said shaft and including the swivel axis of the wheel.

7. A brake for a vehicle wheel, swiveled for steering movement, comprising a brake drum carried by said wheel, a member frictionally engageable with said drum, an actuating element for said member, and a head hinged to said member for transmitting the movement of the actuating element to the member, the said head being so arranged as to absorb the movement of the actuating element in certain predetermined positions of swivel movement of the wheel.

8. In a brake for a wheel, swiveled for steering movement, the combination with a drum of a pair of brake shoes engageable with the drum, an actuating element for the brake shoes, and a pair of members for transmitting the movement of the actuating element to the shoes, the said members being pivoted and being so arranged as to transmit thrust to the brake shoes, when swung to one side of their pivots but being adapted to absorb the movement of the actuating element when swung to the other side of their pivots.

9. In a brake for a vehicle wheel swiveled for steering movement, the combination with a brake drum of a pair of brake shoes engageable with the drum, an actuating element for the brake shoes, a pair of members hinged to the shoes and engageable by the actuating element, a shoulder on each member, and resilient means associated with each member for holding the said shoulder in engagement with the shoe to which said member is hinged, whereby the force exerted by the actuating element will be directly transmitted to the respective brake shoes.

10. In a brake for a vehicle wheel swiveled for steering movement, the combination with a brake drum of a pair of brake shoes engageable with the drum, an actuating element for the brake shoes, a head hinged to each brake shoe and adapted for engagement with the said actuating element, the said heads being so arranged with respect to their hinged connection with the shoes that they may be swung to a position whereby movement of the actuating element will not be transmitted to the brake shoes, and resilient means normally holding the said heads in a position whereby movement of the actuating element will be transmitted directly to the said brake shoes.

11. In a vehicle brake, a brake shoe, a rock shaft for actuating said shoe, and engaged ball and socket members, one of which is carried by said shaft, and the other by said shoe to actuate the latter from the former.

12. A vehicle brake comprising a brake drum, a pair of complementary brake shoes interiorly engageable with said drum, ball members carried by adjacent ends of said shoes, and a pair of diametrically opposed socket members carried by said shaft and engaging said ball members for actuating said shoes through rocking of said shaft.

13. A brake for a vehicle wheel swiveled for steering movement, comprising a brake drum, a member adapted for braking engagement with said drum, an actuating element for said member, and a connection between said actuating element and braking member universally movable relative to the latter.

14. In a vehicle brake, a wheel pivoted to swing laterally of the line of the vehicle, a brake drum on said wheel, a brake element for engagement with the drum, a brake actuating element, a rock shaft mounted on a fixed part of the vehicle and actuated by said brake actuating element, a lever carried by said shaft and having oppositely projecting arms, and links articulately connected to said lever arms and to the ends of the brake element so as to swing inwardly for normal brake applying action when the lever is operated and to swing laterally for brake releasing actions when the wheels are swung laterally.

15. In a vehicle brake, a wheel pivoted to swing laterally of the line of the vehicle, a brake drum on said wheel, a brake element for engagement with the drum, a brake actuating rod, a rock shaft operated thereby and mounted on a fixed part of the vehicle, a lever carried by said shaft and having oppositely projecting arms, and links articulately connected to the lever arms and to the ends of the brake element so as to swing inwardly and outwardly for normal brake applying action when the lever is operated and to swing laterally for brake releasing actions when the wheels are swung laterally.

16. In a vehicle brake, an axle, a wheel pivoted to the axle to swing laterally of the line of the vehicle, a brake drum on said wheel, a brake element for engagement with the drum, a brake actuating rod, a rock shaft mounted on the axle and operated by the rod, a lever carried by said shaft and having oppositely extending arms, and links articulately connected with the lever arms and the ends of the brake element so as to swing inwardly and outwardly for normal brake applying action when the lever is operated and to swing laterally for brake releasing actions when the wheels are swung laterally.

17. In a vehicle brake, an axle, a wheel pivoted to the axle to swing laterally of the line of the vehicle, a brake drum on said wheel, a brake element for engagement with the drum, a brake actuating rod, a rock shaft journaled on the axle and operated by said rod, a lever carried by the shaft and having oppositely extending arms, links articulately connected with the lever arms and the ends of the brake element so as to swing inwardly and outwardly for normal brake applying action when the lever is operated and to swing laterally for brake releasing actions when the wheels are swung laterally, and controlling springs between the lever arms and the ends of the brake element.

18. Brake mechanism for a wheel rotatably mounted on a swivelled knuckle and comprising, in combination, retarding means swivelling with the knuckle, a member swivelling with the knuckle and movable in an approximately horizontal plane to operate the retarding means and having a part moving from a position spaced from the swivelling axis toward said axis, and operating connections engaging said part of the member to apply the retarding means.

19. Brake mechanism for a wheel rotatably mounted on a swivelled knuckle and comprising in combination, retarding means swivelling with the knuckle, an arm carried by the knuckle and moving in an approximately horizontal plane to operate the retarding means and having a part moving from a position spaced from the swivelling axis toward said axis, and operating connections engaging said part of the arm to apply the retarding means.

20. In a vehicle brake, an axle, a wheel pivoted to the axle to swing laterally of the line of the vehicle, brake elements for action on the wheel, a brake rod, a rock shaft journaled on the axle and operated by the rod, a two-armed lever carried by said shaft, and links pivotally coupled to the arms of the lever and to the brake elements to normally move longitudinally of the vehicle when the wheel is traveling in a straight line to transmit the braking force for a brake applying or releasing action of the brake elements and to swing laterally of the vehicle when the wheel is swung laterally to adjust the brake elements to a release position in which it is inoperable for a braking action by the brake rod and parts operated thereby.

21. In a vehicle brake, a wheel pivoted to swing laterally of the line of the vehicle, a brake drum on said wheel, a brake shoe for engagement with the drum, a brake actuating element, a two-armed motion transmitting element operated thereby, and connecting members between the arms of said motion transmitting element and the brake shoe operable by the former for applying and releasing the latter, said connecting members being movable by and through a lateral swinging movement of the wheel for releasing said brake shoe if applied.

22. In a vehicle brake, a wheel pivoted to swing laterally of the line of the vehicle, a brake drum on said wheel, brake elements for engagement with the drum, a rotary brake actuating element journaled upon a fixed part of the vehicle, a motion transmitting lever operated thereby and having arms extending in opposite directions from its pivotal connection, and pivotal connecting members between the respective arms of the lever and the respective ends of the brake elements, said connecting members being movable by the motion transmitting lever in a direction parallel with the vehicle for brake element expanding or contracting movements when the wheel is running in a straight line, and said members being movable by the wheel in a direction at an angle to that first-named for brake releasing movement on a lateral swinging movement of the wheel.

23. In a vehicle brake, a wheel pivoted to swing laterally of the line of the vehicle, a brake drum on said wheel, brake shoes for engagement with the drum, a rotary brake actuating element journaled upon a fixed part of the vehicle, a motion transmitting lever operated thereby and having arms extending in opposite directions from its pivotal connection, and connecting members universally jointed to and coupling the respective arms of said lever to the brake shoes, said members being movable by said lever so as to impart a drum engaging motion to the brake shoes when said brake actuating element is operated for a brake applying action and the wheel is running in a straight line, and said members being movable by the wheel so as to impart a drum releasing motion to the brake shoes when the wheel is swung laterally.

24. A brake for a vehicle wheel, swiveled for steering movement, comprising a brake drum, a brake shoe interiorly engageable with said drum, an actuating element for said shoe, and an actuating connection between said element and shoe having a toggle connection with the latter, a member operating the shoe through the toggle, the relation of the actuating element to the operating member being so modified with swiveling movement of the wheel and the angle which said toggle makes with respect to the shoe as to vary the braking effect transmitted by the actuating element.

EDWIN R. EVANS.